US010820068B2

(12) United States Patent
Henck et al.

(10) Patent No.: US 10,820,068 B2
(45) Date of Patent: Oct. 27, 2020

(54) CONFIGURABLE SENSING SYSTEMS AND METHODS FOR CONFIGURATION

(71) Applicant: Simmonds Precision Products, Inc., Vergennes, VT (US)

(72) Inventors: Thomas Henck, Huntington, VT (US); Matthew B. Burleigh, Essex, VT (US); Travis Gang, Hinesburg, VT (US); Peter J. Carini, Underhill, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 16/270,109

(22) Filed: Feb. 7, 2019

(65) Prior Publication Data
US 2020/0260162 A1 Aug. 13, 2020

(51) Int. Cl.
*H04Q 9/00* (2006.01)
*H04L 29/08* (2006.01)

(52) U.S. Cl.
CPC ............... *H04Q 9/00* (2013.01); *H04L 67/12* (2013.01)

(58) Field of Classification Search
CPC .................................. H04Q 9/00; H04L 67/12
USPC ..................................................... 340/870.07
See application file for complete search history.

(56) References Cited

U.S. PATENT DOCUMENTS

| | | | | |
|---|---|---|---|---|
| 5,103,668 A * | 4/1992 | Drutel | ................... | F02D 41/009 324/207.22 |
| 5,481,372 A * | 1/1996 | Kouno | ..................... | H04N 1/40 358/426.12 |
| 5,815,695 A * | 9/1998 | James | ................. | G06F 9/30058 712/220 |
| 7,237,223 B2 | 6/2007 | Leu et al. | | |
| 8,988,946 B1 * | 3/2015 | D'Abreu | ................ | G11C 16/28 365/185.21 |
| 9,697,358 B2 * | 7/2017 | Serebrin | ................. | G06F 21/64 |
| 2003/0154332 A1 | 8/2003 | Tserng | | |
| 2004/0036511 A1 * | 2/2004 | Otoshi | ................ | H03K 17/165 327/112 |
| 2004/0039511 A1 * | 2/2004 | Garnault | ................ | E05B 81/78 701/49 |

(Continued)

OTHER PUBLICATIONS

Jong-Jin Won et al: "Deterministic Multi-dimensional Task Scheduling Algorithms for Wearable Sensor Devices", KSII Transactions on Internet and Information Systems, vol. 8, No. 10, Oct. 31, 2014 (Oct. 31, 2014), pp. 3423-3438, XP055705899.

(Continued)

*Primary Examiner* — Kerri L McNally
*Assistant Examiner* — Thang D Tran
(74) *Attorney, Agent, or Firm* — Locke Lord LLP; Daniel J. Fiorello; Scott D. Wofsy

(57) ABSTRACT

A sensor system can include a sensor configured to output raw sensor data, a plurality of processing modules configured to process the raw sensor data from the sensor to output processed sensor data, a state module for each processing module operative to cause a respective processing module to receive and/or process the sensor data, and a control module configured to receive a bitmask and to operate each state module based on the bitmask to control which processing modules process the sensor data and/or an order of processing. The bitmask can include a plurality of discrete bits. Each state module and/or processing module can be associated with at least one discrete bit.

19 Claims, 4 Drawing Sheets

(56) References Cited

U.S. PATENT DOCUMENTS

| | | | | |
|---|---|---|---|---|
| 2004/0189838 | A1* | 9/2004 | Sasaki | H04N 5/367 348/242 |
| 2006/0280002 | A1* | 12/2006 | Bull | G06F 9/3869 365/189.07 |
| 2007/0022272 | A1* | 1/2007 | Katayama | G06F 9/3836 712/214 |
| 2007/0265866 | A1* | 11/2007 | Fehling | G06Q 10/06 340/506 |
| 2009/0066798 | A1* | 3/2009 | Oku | G03B 31/00 348/207.99 |
| 2012/0266204 | A1* | 10/2012 | Will | H04N 21/2362 725/116 |
| 2014/0089311 | A1* | 3/2014 | Richards | G06F 11/0727 707/737 |
| 2014/0298049 | A1* | 10/2014 | Cho | G06F 11/3027 713/300 |
| 2015/0095274 | A1* | 4/2015 | Lamb | G06N 3/063 706/25 |
| 2016/0180611 | A1* | 6/2016 | Cadotte | G07C 5/0816 701/30.6 |
| 2017/0109710 | A1 | 4/2017 | Gil | |
| 2017/0262160 | A1 | 9/2017 | Farrell | |
| 2017/0277604 | A1* | 9/2017 | Wang | G05B 19/0421 |
| 2018/0212792 | A1* | 7/2018 | Brandt | H04L 65/1033 |
| 2018/0284735 | A1* | 10/2018 | Cella | G05B 13/028 |
| 2018/0299293 | A1* | 10/2018 | Ell | G01C 21/16 |
| 2019/0041845 | A1* | 2/2019 | Cella | G05B 19/41865 |
| 2019/0166000 | A1* | 5/2019 | Luo | H04W 76/28 |
| 2019/0271726 | A1* | 9/2019 | Chung | G01R 27/08 |
| 2019/0281144 | A1* | 9/2019 | Sachs | H03M 13/35 |

OTHER PUBLICATIONS

Extended European search report issued in corresponding EP application No. 19215795.6, dated Jun. 29, 2020.

* cited by examiner

CONFIGURABLE SENSING SYSTEMS AND METHODS FOR CONFIGURATION

BACKGROUND

1. Field

This disclosure relates to sensing systems, more specifically to configurable sensing systems.

2. Description of Related Art

As sensing systems become more distributed and processing power becomes more available close to the sensing location, the desire to perform value added processing at that location increases as well. This provides both valuable indications from the data being captured quickly and decreases the amount of data passed through the system data bus. Traditional systems do not include configurable processing options and the hardware and/or firmware/software must be subjected to recertification for a new application, for example.

Such conventional methods and systems have generally been considered satisfactory for their intended purpose. However, there is still a need in the art for configurable systems, e.g., sensing systems and methods. The present disclosure provides a solution for this need.

SUMMARY

A sensor system can include a sensor configured to output raw sensor data, a plurality of processing modules configured to process the raw sensor data from the sensor to output processed sensor data, a state module for each processing module operative to cause a respective processing module to receive and/or process the sensor data, and a control module configured to receive a bitmask and to operate each state module based on the bitmask to control which processing modules process the sensor data and/or an order of processing. The bitmask can include a plurality of discrete bits. Each state module and/or processing module can be associated with at least one discrete bit.

Each discrete bit can be configured to include a 1 or a 0. Each state module can be configured to be turned on (e.g., to cause data to be processed by the respective processing module) when an associated bit is a 1. Each state module can be configured to be turned off (e.g., to bypass the respective processing module) when an associated bit is a 0. In certain embodiments, the state module can be operative to configure one or more processing characteristics of a respective processing module (e.g., with a sub bitmask that configures a processing module).

Each state module can be connected to an input of a respective processing module and an input of a respective logic gate (e.g., an OR block, NOR block, XOR block, NAND block), wherein an output of the respective processing module is connected to the input of the logic gate, wherein the state module is configured to either output to the respective processing module or the logic gate to bypass the respective processing module, wherein the respective logic gate is configured to output only data from one of a respective state module or a respective processing module.

The system can include a first state module configured to receive raw sensor data from the sensor or a first logic gate connected to the sensor. The system can include a last state module or last logic gate configured to output processed data from the sensor system. In certain embodiments, each state module after the first state module can be connected to a respective logic gate to receive an input from the respective logic gate.

The sensor can be a data probe for an aircraft. The data probe can include an accelerometer, for example. In certain embodiments, the sensor can be one or more of a strain gage, a temperature sensor, a position sensor, an accelerometer, a tachometer sensor, an index sensor, a magnetic pickup, a pressure sensor, a load sensor, a discrete input/output sensor of Ground/Open, or a discrete input/output sensor with a range of 0.01-30 volts/Open. Any suitable type of sensor and/or physical structure therefor is contemplated herein.

In accordance with at least one aspect of this disclosure, a signal processing system can include a plurality of processing modules configured to process raw sensor data from a sensor to output processed sensor data, a state module for each processing module operative to cause a respective processing module to receive and/or process the sensor data, and a control module configured to receive a bitmask and to operate each state module based on the bitmask to control which processing modules process the sensor data and/or an order of processing. Any other suitable embodiments of the signal processing system are contemplated herein (e.g., as described above with respect to a sensor system).

A method for signal processing (e.g., in a sensor system) can include creating a bitmask having discrete bits, each discrete bit associated with a respective processing module, sending the bitmask to a control module to control which processing modules process sensor data and/or in which order, selecting processing modules and/or an order thereof to process sensor data using the control module based on the bitmask, and processing sensor data using the processing modules in accordance with the bitmask to output processed data. Creating the bitmask can include assigning a 1 or a 0 to each discrete bit, and selecting processing modules can include using a respective processing module when an associated bit is a 1, and not using a respective processing module when an associated bit is a 0. Any other suitable methods and/or portions thereof are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
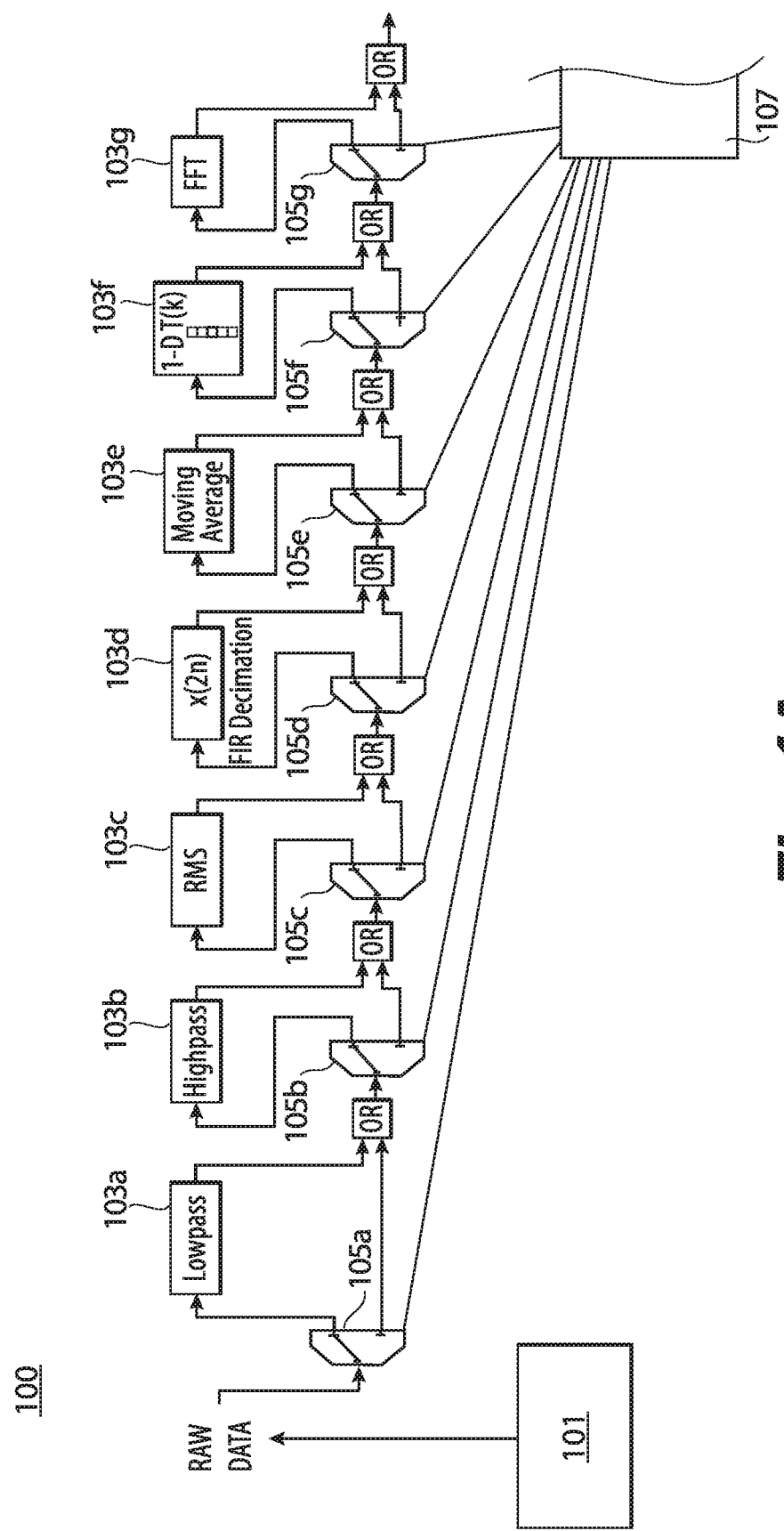
FIGS. 1A and 1B are a schematic diagram of an embodiment of a sensor system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to improve the functionality of sensor systems by providing a configurable without requiring recertification and also without the need for complex control schemes.

Figure 1B:
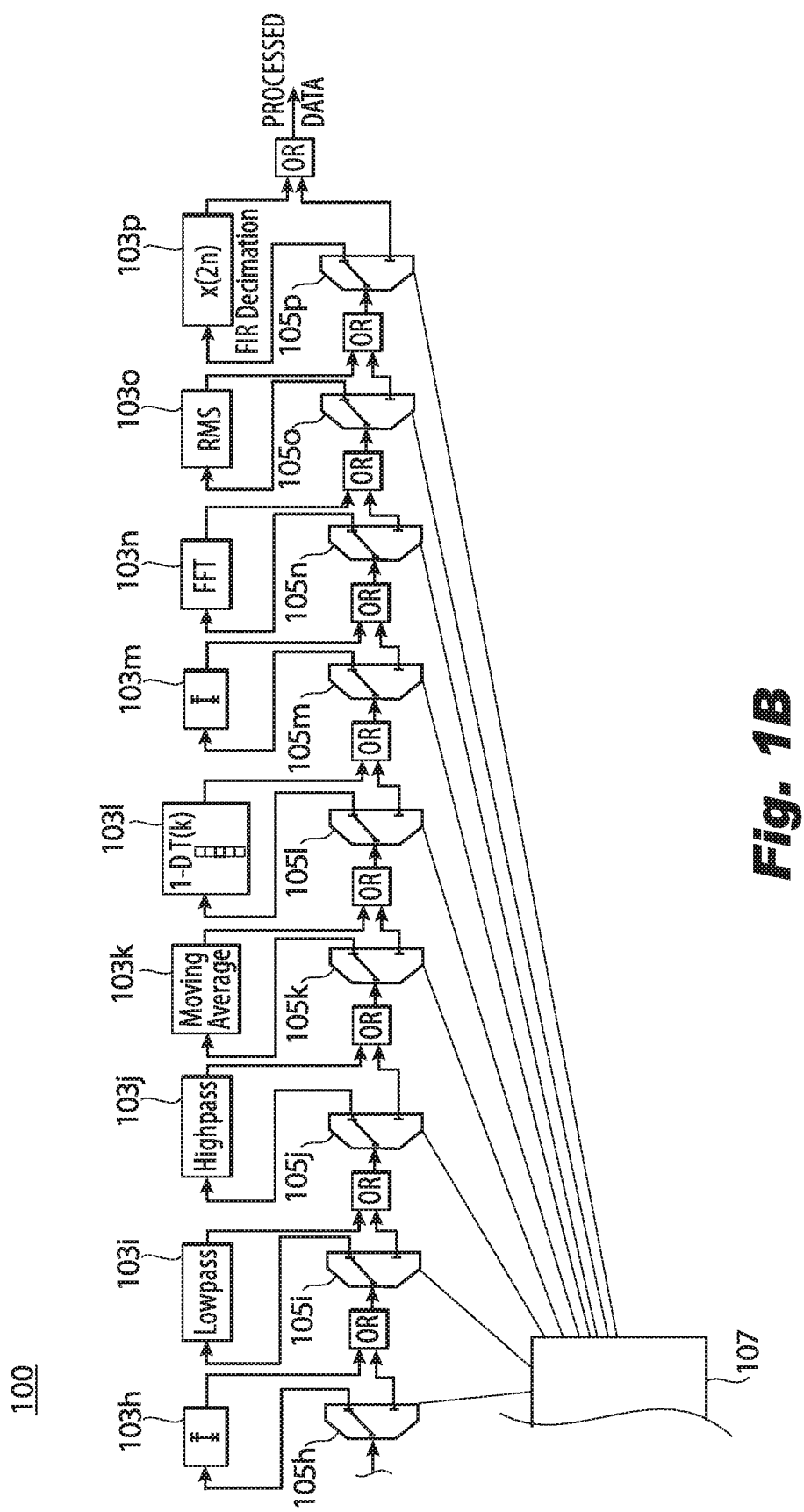

Referring to FIGS. 1A and 1B, a sensor system 100 can include a sensor 101 configured to output raw sensor data (e.g., an analog or digital signal). For example, the sensor 101 can be a physical sensor configured to physically react to an environmental condition to produce an electrical signal that can be output as raw data. The sensor 101 can be a data probe for an aircraft, e.g., a smart data probe as appreciated by those having ordinary skill in the art. The data probe can include an accelerometer, a pitot tube, or any other suitable data sensor for example. Any suitable type of sensor and/or physical structure therefor is contemplated herein.

The system 100 can include a plurality of processing modules 103*a-p* configured to process the raw sensor data from the sensor 101 to output processed sensor data. In certain embodiments, the system 100 can include a state module 105*a-p* for each processing module 103*a-p* operative to cause a respective processing module 103*a-p* to receive and/or process the sensor data.

Figure 2A:
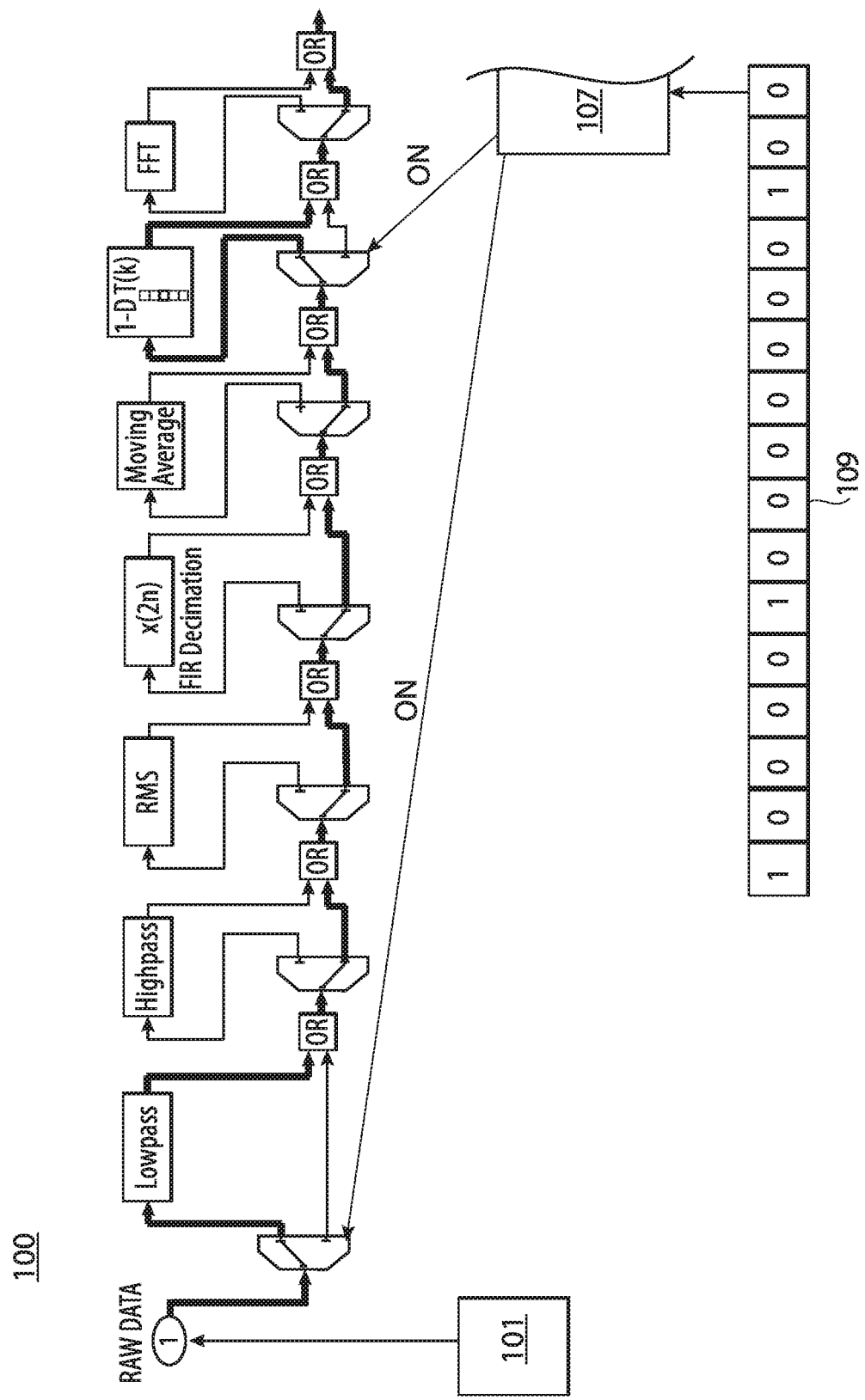
FIGS. 2A and 2B are a schematic diagram of the embodiment of FIG. 1, shown configured as a function of an embodiment of a bitmask.
Figure 2B:
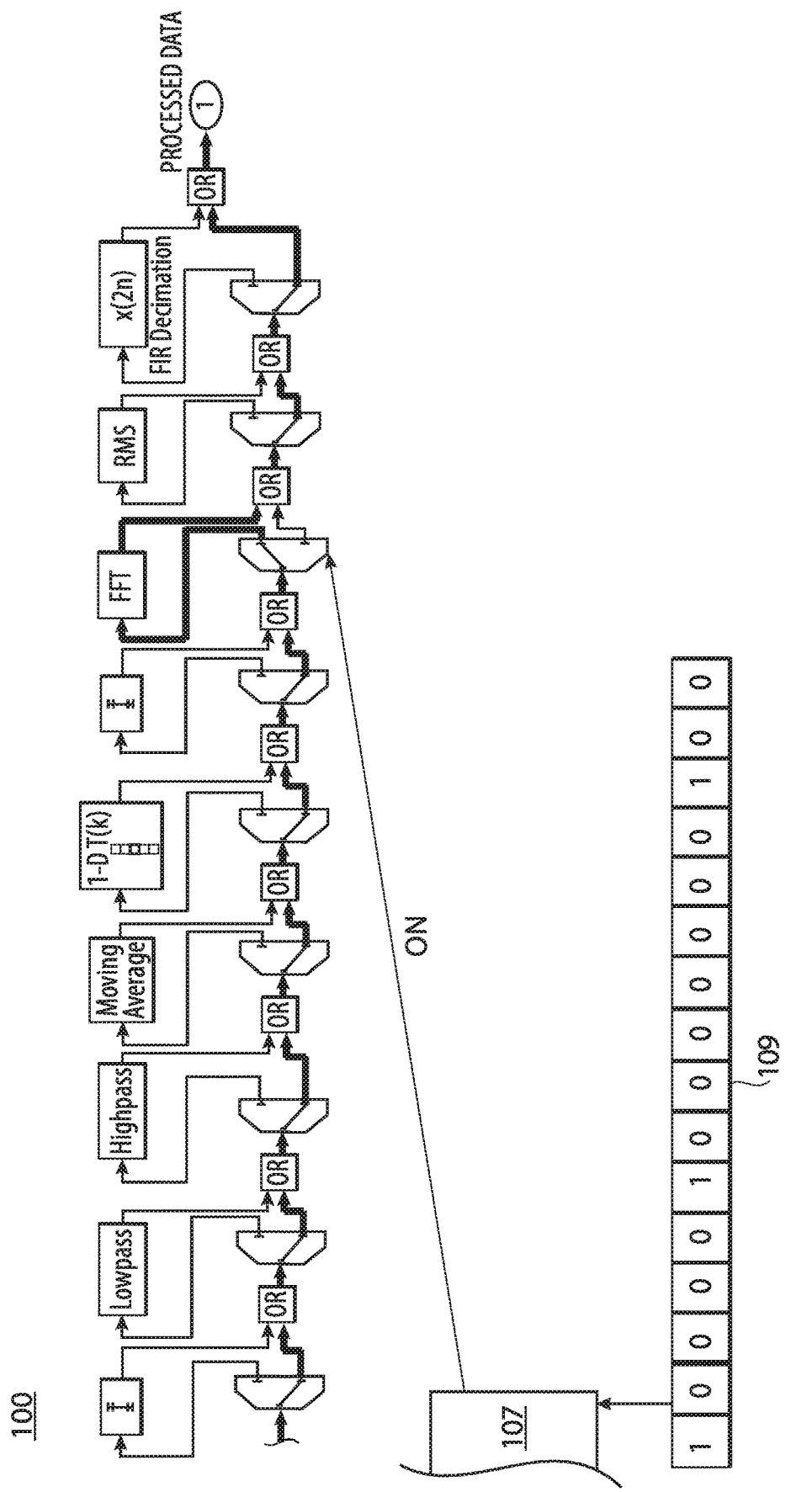

The system 100 can include a control module 107 configured to receive a bitmask 109 (e.g., as shown in FIGS. 2A and 2B) and to operate each state module 105*a-p* based on the bitmask 109 to control which processing modules 103*a-p* process the sensor data and/or an order of processing. The control module 107 can be operatively connected to any suitable input to receive one or more bitmasks (e.g., an external computer connected wirelessly or hardwired).

The bitmask 109 can include a plurality of discrete bits, for example (e.g., 16 bits as shown, 32 bits, or any other suitable number of bits). In certain embodiments, each state module 105*a-p* and/or processing module 103*a-p* can be associated with at least one discrete bit. In certain embodiments, a plurality of state modules can be associated with a single bit. Any other suitable use of a bitmask by the controller to control the state modules and/or processing modules is contemplated herein. An example bit/processing type association is shown below in Table 1.

In certain embodiments, the state module 105*a* can be associated with bit 1, state module 105*b* can be associated with bit 2, and so on through state module 105*p* and bit 16. Any other suitable association is contemplated herein. Multiple associations are also contemplated herein such that a single state module and/or processing module can be associated with multiple bits.

Processing modules 103*a-p* can be configured to perform any suitable processing function. For example, as shown above in Table 1, one or more of processing modules 103*a-p* can be configured to be a low pass filter, a high pass filter, a RMS processor, a decimation processor, a fast Fourier transform (FFT) processor, a standard deviation processor, and/or any other suitable type of processor/filter.

TABLE 1

| Bit | Processing Type |
|---|---|
| 1 | Lo- Pass Filter |
| 2 | Hi-Pass Filter |
| 3 | RMS 1 |
| 4 | Decimation 1 |
| 5 | Average 1 |
| 6 | Lookup Table 1 |
| 7 | FFT 1 |

TABLE 1-continued

| Bit | Processing Type |
|---|---|
| 8 | Standard Deviation 1 |
| 9 | Lo- Pass Filter |
| 10 | Hi-Pass Filter |
| 11 | Average 2 |
| 12 | Lookup Table 2 |
| 13 | Standard Deviation 2 |
| 14 | FFT 2 |
| 15 | RMS 2 |
| 16 | Decimation 2 |

In certain embodiments, each discrete bit can be configured to include a 1 or a 0. As shown in FIGS. 2A and 2B, each state module 105*a-p* can be configured to be turned on (e.g., to cause data to be processed by the respective processing module 103*a-p*) when an associated bit is a 1. Each state module 105*a-p* can be configured to be turned off (e.g., to bypass the respective processing module 103*a-p*) when an associated bit is a 0. In certain embodiments, the opposite may be true such that one or more state modules 105*a-p* can be turned off when an associated bit is a 1, and on when an associated bit is 0. Any suitable bit value for on or off is contemplated herein, and whether 0 or 1 is on or off can vary by state module.

In certain embodiments, the state module 105*a-p* can be operative to configure one or more processing characteristics (e.g., frame rate, sample size, etc.) of a respective processing module 103*a-p* (e.g., with a sub bitmask that configures a processing module 103*a-p*). In certain embodiments, one or more of the processing modules 103*a-p* can be configured to receive a sub bitmask (e.g., similar to bitmask 109) and to modify a processing characteristic of the processing module 103*a-p*).

In certain embodiments, each state module 105*a-p* can be connected to an input of a respective processing module and an input of a respective logic gate, e.g., an OR block as shown. The logic gate can include any suitable logic gate (e.g., an OR block, NOR block, XOR block, NAND block). An output of the respective processing module 103*a-p* can be connected to the input of the logic gate. The state module 105*a-p* can be configured to either output to the respective processing module 103*a-p* or the respective logic gate to bypass the respective processing module 103*a-p*, e.g., as shown. The respective logic gate can be configured to output only data from one of a respective state module 105*a-p* or a respective processing module 103*a-p*.

As shown, the system 100 can include a first state module 103*a* configured to receive raw sensor data from the sensor 101 or a first logic gate connected to the sensor 101. The system 101 can include a last state module 103*p* or last logic gate configured to output processed data from the sensor system 100. In certain embodiments, each state module 105*a-p* after the first state module 105*a* can be connected to a respective logic gate to receive an input from the respective logic gate, e.g., as shown.

Below are shown two different bitmask examples that lead to equivalent processing for the system shown in FIGS. 2A and 2B, and listed out in Table 1.

| Bitmask Example 1 | | | | | | | | | | | | | | | |
|---|---|---|---|---|---|---|---|---|---|---|---|---|---|---|---|
| 1 | 0 | 0 | 0 | 0 | 1 | 1 | 0 | 0 | 0 | 0 | 0 | 0 | 0 | 0 | 0 |

| Bitmask Example 2 | | | | | | | | | | | | | | | |
|---|---|---|---|---|---|---|---|---|---|---|---|---|---|---|---|
| 1 | 0 | 0 | 0 | 0 | 1 | 0 | 0 | 0 | 0 | 0 | 0 | 0 | 1 | 0 | 0 |

Based on the bitmasks above, in accordance with Table 1, the user has selected the device to perform a Lo-Pass Filter, followed by a Lookup Table, followed by an FFT. The second bitmask is an equivalent processing set selection. Each respective process type can be further configured to provide tailoring of the filtering threshold, lookup table contents, and FFT characteristics, for example. Such bitmasks can accomplish a large scope of processing while not impacting software/firmware and only changing configuration options. Referring to FIGS. 2A and 2B, represented graphically, the processing flow options selected by the above example bitmask 2 is shown. State modules 105a, 105f, and 103n are a switch commanded to the on position, which causes data flow to processing modules 103a, 103f, and 103n.

Any suitable number of processing modules 103a-p and/or state modules 105a-p are is contemplated herein. As appreciated by those having ordinary skill in the art in view of this disclosure, the embodiments shown and described are representative of certain functional modules of a system 100. It is contemplated that the processing modules 103a-p, the state modules 105a-p, and the control module 107 can be implemented in a single module and/or any suitable number of separate modules having any suitable hardware and/or computer software (e.g., including firmware). In certain embodiments, the processing modules and the state modules can be the same module. In certain embodiments the processing modules, the state modules, and the control module can be hosted on a single computerized device associated with the sensor 101 (e.g., hosted in a memory of a sensor 101 and/or on a circuit of sensor 101). It is contemplated that the control module 107 and the state modules 105a-105p can be a single module, for example. It is also contemplated that the control module 107 can be a plurality of modules (e.g., one for each state module 105a-105b) or can be hosted in each state module 105a-p and/or processing module 103a-p. Any suitable partitioning of modules and/or functions thereof amongst any suitable hardware module(s) and/or software module(s) in any suitable manner is contemplated herein.

Any suitable user GUI or data input to on any suitable computing device is contemplated herein. For example, a user can manually input numbers into a bitmask field, or a graphical selection list (e.g., interactive, moveable boxes labeled with possible processing functions for selecting processing functions and/or arranging a suitable order of processing). Any other suitable input into the control module 107 is contemplated herein.

In accordance with at least one aspect of this disclosure, a signal processing system can include a plurality of processing modules configured to process raw data (e.g., sensor data from a sensor) to output processed data, a state module for each processing module operative to cause a respective processing module to receive and/or process the data, and a control module configured to receive a bitmask and to operate each state module based on the bitmask to control which processing modules process the data and/or an order of processing. Any other suitable embodiments of the signal processing system are contemplated herein (e.g., as described above with respect to a sensor system).

A method for signal processing (e.g., in a sensor system) can include creating a bitmask having discrete bits, each discrete bit associated with a respective processing module, sending the bitmask to a control module to control which processing modules process sensor data and/or in which order, selecting processing modules and/or an order thereof to process sensor data using the control module based on the bitmask, and processing sensor data using the processing modules in accordance with the bitmask to output processed data. Creating the bitmask can include assigning a 1 or a 0 to each discrete bit, and selecting processing modules can include using a respective processing module when an associated bit is a 1, and not using a respective processing module when an associated bit is a 0. Any other suitable methods and/or portions thereof are contemplated herein. Any suitable method and/or portions thereof can be performed by any suitable computer module and/or embodied as computer executable instructions stored on a non-transitory computer readable medium, for example.

Embodiments can provide post processing bitmask permutation options for sensor channels. Embodiments include a method of providing a predefined set of processing options that can be selected without modification of software or firmware. A user can select the desired processing operations through the use of a bitmask (e.g., sent from a suitable GUI operated by the user to the control module 107) to detail which processing options will be utilized and/or define the order of processing to be performed. In certain embodiments, each type of processing can be further configured through a set configuration messages (e.g., sub bitmasks sent to the processing modules 103a-p and/or state modules 105a-p to configure the processing module in accordance with the bitmask).

Embodiments can be applied to condition monitoring systems, for example. Such condition monitoring systems can be used to monitor parameters in machinery via temperature, pressure, vibration sensors, etc., to detect the development of faults as compared to normal operating conditions. The sensor data collected can be digitized, transformed, and algorithmically processed to extract features of the monitored system. A given feature can be generated from the input of one sensor or could be dependent on the interaction of multiple sensors. Features extracted can be compared against expected values, enumerating the relative health of that feature. Sensor data can be monitored and evaluated on a scheduled basis, as a function of the regime the monitored system is in, and/or based upon the detection of an event outside of normal operating conditions. Traditional implementations of a condition monitoring system can include a number of analog sensors feeding into a central host for digitization and further processing. Traditional implementation requires individual cabling for each analog sensor and can result in a heavy system and complicated installation. These issues can be mitigated by distributing digitization and processing of data out locally to the sensor. Sensors that have the capability to perform local digitization and processing are known as digital or smart sensors. Local processing of data can reduce the processing load on the host, allowing the host to perform other more complex functions, or decrease in size and complexity. Transmission of digital data allows multiple digital sensors to be connected on a single digital bus, reducing the wire weight associated with individual analog wire runs for each sensor.

Local processing is not necessarily easy to achieve, especially for commercial certified aerospace applications where cost is counterbalanced by DO-178 and DO-254 certification processes. It is desirable for, and embodiments can provide, a scalable smart sensing system to accommodate many processing types out of the box with minimal configuration and no firmware or software modification. To accomplish, embodiments can utilize a bitmask selection command to control what processing you want to invoke and the order in which it will be invoked. Each processing type can have default values that can then also be reconfigured with a specific set of commands for that processing type. For example the decimation process type may have a default to decimate by half (selecting every other data point); this can be configured to 1 out of 10 or any other integer within the dataset size.

Traditional processing options are hard coded in software or firmware requiring modification to code to enhance the available processing. Certain embodiments of this disclosure, however, allow predefined process options and predefined order of those processing options which can allow a user to select which processing they would like to invoke/use (and/or in which order) to achieve the desired processed dataset. Each processing option can also be configurable with a separate command set in any suitable manner (e.g., for the decimation processing type, a sub bitmask can configure how much to decimate the dataset by).

While embodiments are disclosed with respect to sensor systems, embodiments are applicable for any suitable system. Embodiments can allow movement of data more efficiently while trying to maintain flexible yet deterministic system communication protocols.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system," for example. A "circuit," "module," or "system," for example, can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A sensor system, comprising:
a sensor configured to output raw sensor data;
a plurality of processing modules configured to process the raw sensor data from the sensor to output processed sensor data;
a plurality of state modules, at least one state module for each processing module operative to cause a respective processing module to receive and/or process the sensor data; and
a control module configured to receive a bitmask and to operate each state module based on the bitmask to control which processing modules process the sensor data and/or an order of processing, wherein each state module is directly connected to an input of the respective processing module and directly connected to an input of a respective OR block, wherein an output of the respective processing module is connected to the input of the logic gate, wherein the state module is configured to either output to the respective processing module or the logic gate to bypass the respective processing module, wherein the respective logic gate is configured to output only data from one of a respective state module or a respective processing module.

2. The system of claim 1, wherein the bitmask includes a plurality of discrete bits, wherein each state module and/or processing module is associated with at least one discrete bit.

3. The system of claim 2, wherein each discrete bit is configured to include 1 or 0.

4. The system of claim 3, wherein each state module is configured to be turned on when an associated bit is a 1, and wherein each state module is configured to be turned off when an associated bit is a 0.

5. The system of claim 1, wherein the state module is operative to configure one or more processing characteristics of the respective processing module.

6. The system of claim 1, further including a first state module configured to receive raw sensor data from the sensor or a first logic gate connected to the sensor.

7. The system of claim 6, further including a last state module or last logic gate configured to output processed data from the sensor system.

8. The system of claim 7, wherein each state module after the first state module is connected to the respective logic gate to receive input from the respective logic gate.

9. The system of claim 1, wherein the sensor is a data probe for an aircraft.

10. The system of claim 1, wherein the data probe includes an accelerometer.

11. A signal processing system, comprising;
a plurality of processing modules configured to process raw sensor data from a sensor to output processed sensor data;
a plurality of state modules, at least one for each processing module operative to cause a respective processing module to receive and/or process the sensor data; and
a control module configured to receive a bitmask and to operate each state module based on the bitmask to control which processing modules process the sensor data and/or an order of processing, wherein each state module is directly connected to an input of the respective processing module and directly connected to an input of a respective OR block, wherein an output of the respective processing module is connected to the input of the logic gate, wherein the state module is configured to either output to the respective processing module or the logic gate to bypass the respective processing module, wherein the respective logic gate is configured to output only data from one of a respective state module or a respective processing module.

12. The system of claim 11, wherein the bitmask includes a plurality of discrete bits, wherein each state module and/or processing module is associated with at least one discrete bit.

13. The system of claim 12, wherein each discrete bit is configured to include 1 or 0.

14. The system of claim 13, wherein each state module is configured to be turned on when an associated bit is 1, and wherein each state module is configured to be turned off when an associated bit is 0.

15. The system of claim 11, wherein the state module is operative to configure one or more processing characteristics of a respective processing module.

16. The system of claim 11, wherein each state module is connected to an input of the respective processing module and an input of a respective logic gate, wherein an output of the respective processing module is connected to the input of the logic gate, wherein the state module is configured to either output to the respective processing module or the logic gate to bypass the respective processing module, wherein the respective logic gate is configured to output only data from one of a respective state module or a respective processing module.

17. The system of claim 16, further including a first state module configured to receive raw sensor data from the sensor or a first logic gate connected to the sensor.

18. A method for signal processing, comprising:
creating a bitmask having discrete bits, each discrete bit associated with a respective processing module; and
sending the bitmask to a control module to control which processing modules process sensor data and/or in which order;
operating a state module that is directly connected to each processing module and to a respective logic block to select processing modules and/or an order thereof to process sensor data using the control module based on the bitmask; and
processing sensor data using the processing modules in accordance with the bitmask to output processed data.

19. The method of claim 18, wherein creating the bitmask comprises assigning a 1 or a 0 to each discrete bit, wherein selecting processing modules includes using the respective processing module when an associated bit is 1, and not using a respective processing module when an associated bit is 0.

* * * * *